July 7, 1959

D. R. McNEAL 2,893,681

PLUG VALVE OPERATING MECHANISM

Filed May 4, 1956

INVENTOR
Daniel Raymond McNeal
BY
ATTORNEYS

July 7, 1959

D. R. McNEAL 2,893,681

PLUG VALVE OPERATING MECHANISM

Filed May 4, 1956

INVENTOR
Daniel Raymond McNeal
BY
Synnestvedt & Lechner
ATTORNEYS

United States Patent Office 2,893,681
Patented July 7, 1959

2,893,681

PLUG VALVE OPERATING MECHANISM

Daniel Raymond McNeal, Abington, Pa., assignor to Andale Company, Philadelphia, Pa., a corporation of Pennsylvania Application May 4, 1956, Serial No. 582,825

3 Claims. (Cl. 251—161)

The present invention relates to plug valves of the tapered type which are adapted to be subjected to relatively high internal fluid pressures and more particularly to switching plug valve assemblies such as are employed in connection with the operation of duplex basket straining units for the purpose of permitting access to a strainer in one compartment for cleaning or other purpose while still circulating fluid through a strainer in the other compartment.

In such valves it has been found difficult to manually turn the plug valve for a switching operation because the fluid pressure functions as a thrust force causing such a degree of friction between the movable parts and the stationary parts that the valve cannot be turned by ordinary manually applied power.

An object of the present invention is to provide a valve assembly of the turnable tapered plug type wherein frictional resistance to turning is reduced to a minimum.

Another object is to provide a novel thrust bearing for switching plug valves employed with basket strainer units.

Another object is to provide a valve assembly wherein a tapered plug valve is mounted for both axial and turning movement in combination with means to resist axial thrust of the valve due to internal fluid pressure so that turning of the valve is easily accomplished under manually applied power.

A further object is to provide a valve assembly wherein the valve stem has a movement controlling mounting including a thrust roller bearing arranged to compensate for internal pressure applied to the valve and permit free turning of the valve stem and its valve.

Other objects and features of advantage of the invention will be found throughout the following more detailed description when considered with the accompanying drawings wherein.

Figure 1:
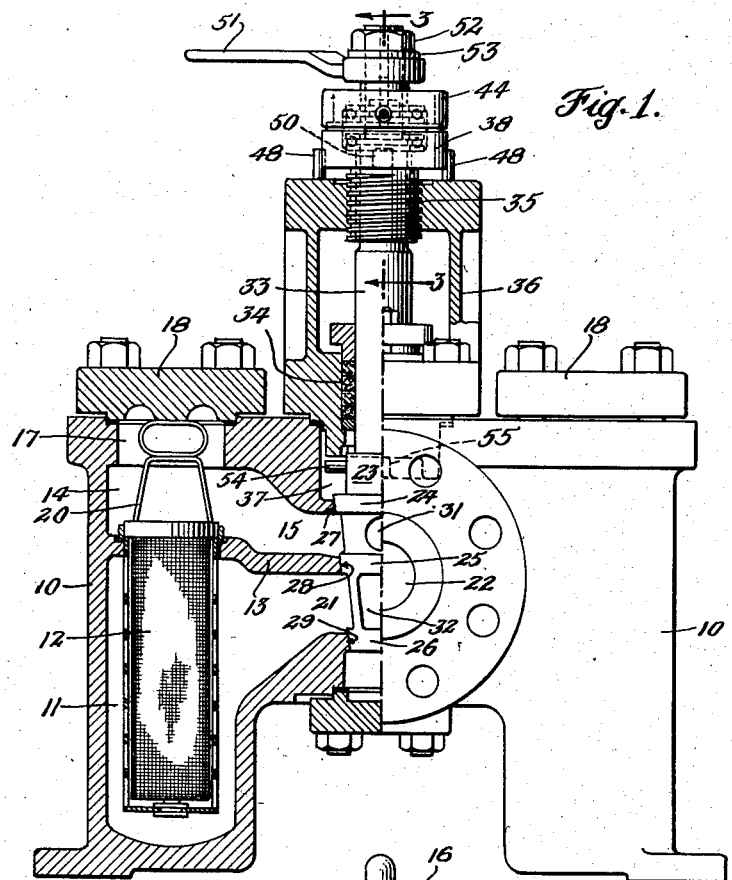
Figure 1 is a composite side elevation and vertical section of a switching, tapered, plug valve for duplex basket strainers embodying a preferred form of the present invention.
Figure 2:
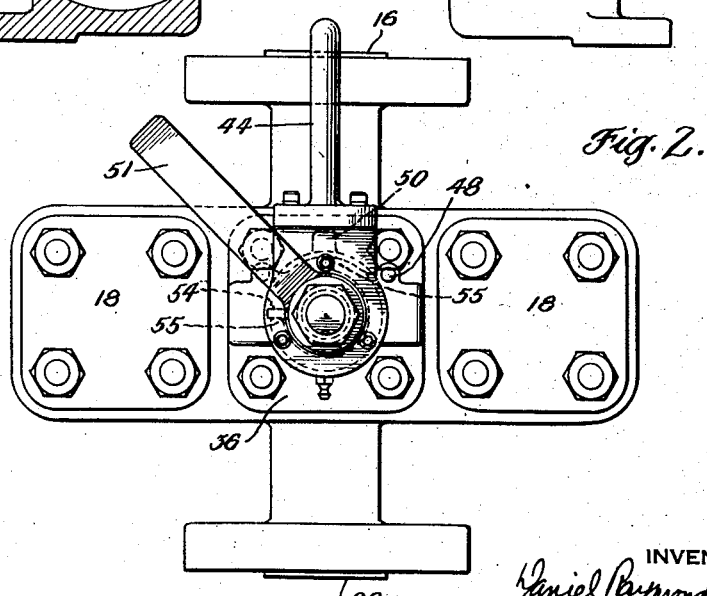
Figure 2 is a plan view of Figure 1.
Figure 3:
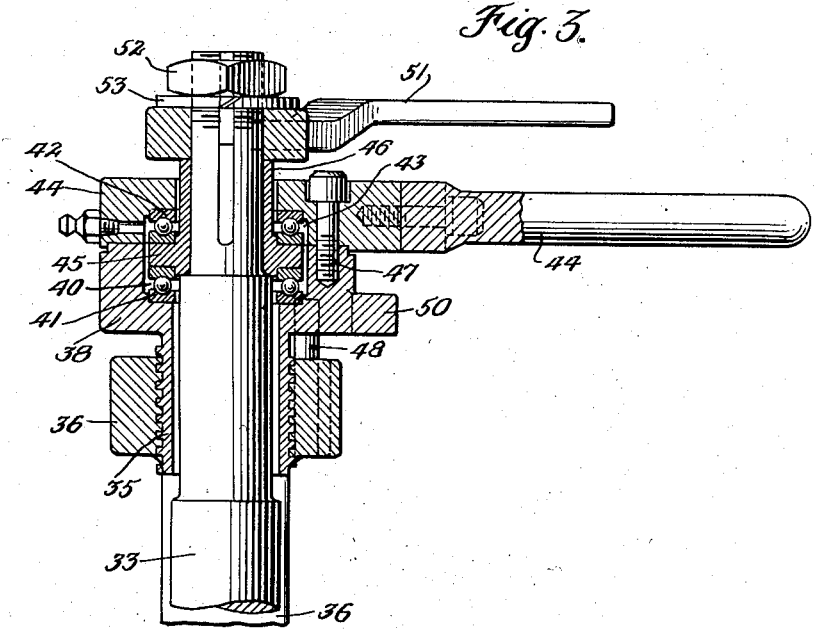
Figure 3 is a fragmentary medial view in section taken on line 3—3 of Figure 1.
Figure 4:
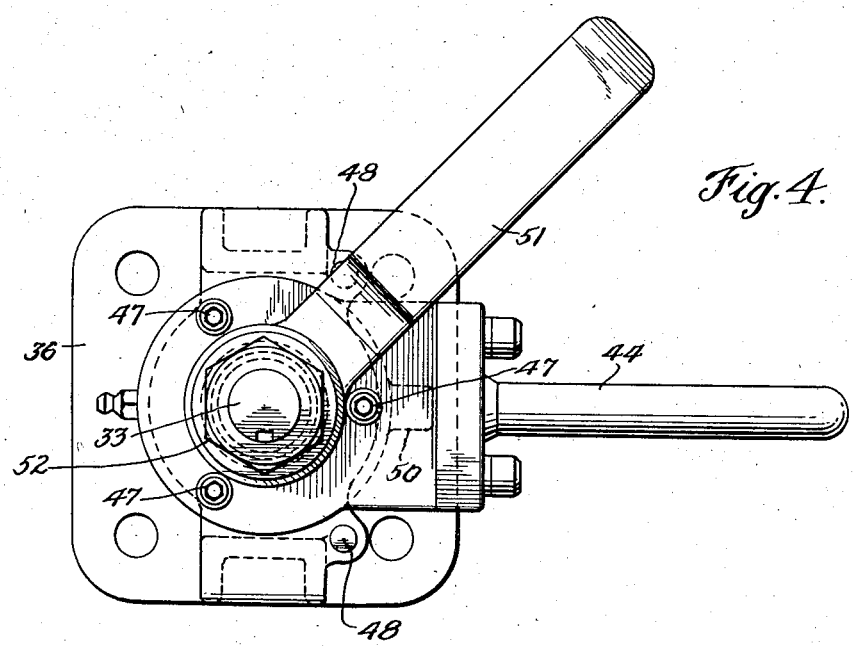
Figure 4 is an enlarged plan view of the valve assembly detached from the strainer unit.

Referring to the drawings, and initially to Figures 1 and 2, a strainer unit of the duplex basket type is shown with its operating valve assembly for proper directional control of the fluid being strained. Since the present invention relates primarily to the valve assembly, one side only of the strainer unit per se will be described as illustrative of both sides since the two sides are the same. Thus the strainer body 10 at each side is formed with a compartment 11 for the reception of a basket strainer 12 which is suspended from a transverse flange 13 integral with the body 10. The flange 13 forms an upper chamber 14, which includes a transverse passage 15 communicating with a like passage for the other chamber and also communicating with a fluid inlet 16. The body 10 has a top opening 17 giving access to the compartment for removal or insertion of a strainer 12. This opening 17 has a removable cover 18, as a seal, which also coacts with a spring type basket handle 20.

The flange 13 also forms with the body 10 a transverse passage 21 leading to the compartment of the other strainer and communicating with the discharge outlet 22.

For controlling and selectively directing the circulation of fluid through the two basket strainers, a plug valve 23 is provided having three tapered valve discs 24, 25, and 26 linearly spaced to coact respectively with three complementally tapered alined seats 27, 28 and 29. The seat 27 is formed in a top portion of the body 10; the seat 28 is formed in the flange 13; and the seat 29 is formed in a bottom portion of the body 10. The plug valve 23 has a lateral port 31 for selectively establishing communication between the passage 15 and the inlet 16, and also has a port 32 for selectively establishing communication between the passage 21 and the outlet 22.

As a means for operating the plug valve 23, it is carried by a stem 33 rising through a stuffing box 34 to pass axially through a jack screw 35, which is threaded into a yoke or bonnet 36 attached to the top of the body 10 in coaxial relation to the aperture 37 provided for the passage of the valve plug 23. The outer or projecting end of the jack screw 35 has an annular head 38 forming a cup 40 to seat a ball race 41 as a part of the thrust bearing of which a second ball race 42 forms the other part. This race 42 is located in a socket 43 of a jack lever 44 and seats upon a circumferential flange 45 of a bushing 46 through which the reduced diameter end of the valve stem 33 passes. The bushing 46 is keyed to the stem and seats upon a shoulder on the stem 33 while the flange 45 seats upon the ball race 41, thereby forming a frictionless thrust bearing.

For manual seating and unseating of the valve plug 23 to release the valve for easy turning, the jack lever 44 is attached by studs 47 to the jack screw head 38, while two stop pins 48 project upwardly from the yoke 36, ninety degrees apart, to lie in the path of a lug 50 which projects radially from the head 38. In this connection it should be noted that in seated position of the valve plug 23, the jack lever 44 is initially set forty five degrees from each stop pin 48 and can move freely either way and this arrangement is particularly advantageous when moving to seating position of the valve as thereby wear can be taken up.

In order to turn the plug valve 23 from one fluid circulating position to the other, that portion of the valve stem 33, which projects through the bushing 46, has a turn lever 51 keyed thereon and held in place against the upper end of the bushing 46 by a nut 52 threaded on the stem 33 and locked by a lock washer 53. The turning limits of the plug valve 23 are defined by a stop pin 54 projecting radially from the valve stem 33 to swing through an arc of ninety degrees to abut one or the other of two lugs 55 formed as part of the bonnet 36. When the jack screw 35 is moved upwardly by the handle 44 the bushing 46 moves the stem 33 to lift the plug valve and when the jack screw is moved downwardly by the handle 44 the bushing 46 moves the stem 33 to lower or seat the plug valve.

It will now be apparent that a complete unitary thrust mounting for the stem of a turnable, tapered, plug valve has been devised whereby the friction between movable and stationary valve parts, developed by the axial thrust of internal fluid pressure, has been so reduced as to permit free operation of the valve stem by normal manual power.

I claim:

1. Mechanism for operating a tapered plug valve comprising in combination with the plug valve and the body in which it is housed; a valve stem projecting outwardly of the body; a hollow jack screw surrounding the stem and threaded into a supporting member which is fixed with relation to the body; a cup-like recess in the jack screw; a bushing surrounding and keyed to the stem; a flange on the bushing and projecting into said recess; anti-friction bearing means above and below said flange upon which bearing means the bushing is adapted to turn; a jacking handle secured to the jack screw by means of which the screw can be turned, interengaging means between the bushing and the stem whereby the stem with its valve can be raised or lowered when the screw is turned; and a handle for turning the stem and the bushing.

2. A valve plug assembly, comprising a body having an inlet and an outlet, means including a valve plug for controlling fluid circulation from said inlet to said outlet, a stem for said valve projecting from said body, a jack screw surrounding said stem and threaded into said body, lever means for turning said jack screw in said threads, anti-friction thrust bearing means for the stem mounted to move as a unit with the jack screw in both directions axially of the valve stem, means fixed to the valve stem to move therewith and mounting the stem for turning movement in said thrust bearing means, and a second lever means for turning said valve stem in said thrust bearing means.

3. A thrust resisting mounting for the stem of a turnable plug valve, comprising a yoke for attachment to a valve body, a jack screw threaded into said yoke, a head on said screw forming a cup, a ball race in said cup, a bushing, a circumferential flange on said bushing seated on said ball race, means including a hand lever for turning said jack screw, said means having a socket juxtaposed to said cup, a ball race in said socket seated on said flange, a shouldered valve stem extending through said jack screw and bushing with its shoulder abutting said bushing, said bushing, cup, ball races and hand lever forming a unitary thrust mounting for the stem which thrust mounting moves axially with the jack screw as the latter is turned in the yoke threads, and means including a second hand lever for turning said valve stem.

References Cited in the file of this patent

UNITED STATES PATENTS

| | | |
|---|---|---|
| 1,976,052 | Whittle | Oct. 9, 1934 |
| 2,060,388 | Whittle | Nov. 10, 1936 |
| 2,215,853 | McNeal | Sept. 24, 1940 |
| 2,541,715 | Oestreicher | Feb. 13, 1951 |